(12) United States Patent
Liu

(10) Patent No.: US 8,738,100 B2
(45) Date of Patent: May 27, 2014

(54) BATTERY COVER ASSEMBLY FOR PORTABLE ELECTRONIC DEVICE

(71) Applicants: Shenzhen Futaihong Precision Industry Co., Ltd., Shenzhen (JP); FIH (Hong Kong) Limited, Kowloon (HK)

(72) Inventor: Jun-Fang Liu, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 0 days.

(21) Appl. No.: 13/719,852

(22) Filed: Dec. 19, 2012

(65) Prior Publication Data

US 2013/0273981 A1    Oct. 17, 2013

(30) Foreign Application Priority Data

Apr. 16, 2012    (CN) .................. 2012 2 0158754 U

(51) Int. Cl.
*H04M 1/00*    (2006.01)

(52) U.S. Cl.
USPC ............ 455/575.1; 429/96; 429/97; 429/100

(58) Field of Classification Search
USPC ........................................ 455/575.1
See application file for complete search history.

(56) References Cited

U.S. PATENT DOCUMENTS

| | | | |
|---|---|---|---|
| 2010/0143775 A1* | 6/2010 | Li | 429/96 |
| 2011/0020684 A1* | 1/2011 | Liang et al. | 429/100 |
| 2011/0129713 A1* | 6/2011 | Liang | 429/97 |

* cited by examiner

*Primary Examiner* — Ajibola Akinyemi
(74) *Attorney, Agent, or Firm* — Novak Druce Connolly Bove + Quigg LLP

(57) ABSTRACT

A battery cover assembly for a portable electronic device includes a housing and a battery cover. The housing defines latching holes and a notch. The notch defines a resisting wall. The battery cover includes clasps and a resisting sheet. The resisting sheet includes a resisting portion which has a hooked portion formed thereon and towards the resisting wall. The clasps are latched in the latching holes. The resisting portion is latched in the notch, and the hooked portion resists against the resisting wall.

14 Claims, 4 Drawing Sheets

BATTERY COVER ASSEMBLY FOR PORTABLE ELECTRONIC DEVICE

CROSS-REFERENCE TO RELATED APPLICATIONS

This application is related to co-pending U.S. patent application Ser. No. 13/664,624, entitled "BATTERY COVER ASSEMBLY FOR PORTABLE ELECTRONIC DEVICE". Such application has the same assignee as the present application. The above-identified application is incorporated herein by reference.

BACKGROUND

1. Technical Field

The present disclosure generally relates to battery cover assemblies, and particularly to a battery cover assembly for use in a portable electronic device.

2. Description of Related Art

Batteries are widely used in portable electronic devices, such as personal digital assistants mobile phones, and so on. Conventional batteries are received in the electronic device, and battery covers are designed to connect with housings of the electronic devices to package the batteries. The batteries are replaced by opening the battery covers when, for example, the batteries are damaged and/or dead (i.e., no longer rechargeable).

One kind of the battery cover includes conventional hooks made of metal. The hooks are configured for engaging in slots of the housing. However, the metal hooks are easily deformed in daily use. This will make the engagement between the battery cover and the housing of the mobile phone to loosen so that the assembled battery cover is not stably attached to the housing. More seriously, the deformed metal hooks cannot be assembled in the slots of the housing.

Therefore, there is room for improvement within the art.

BRIEF DESCRIPTION OF THE DRAWINGS

Many aspects of the disclosure can be better understood with reference to the following figures. The components in the figures are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
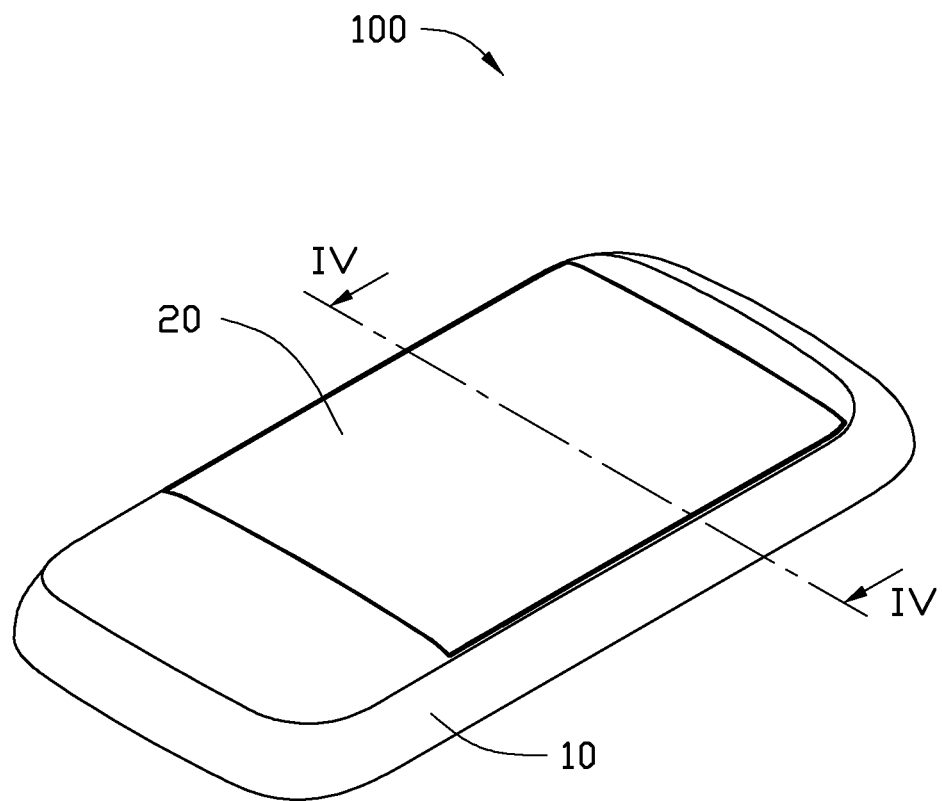
FIG. 1 is an isometric view of a portable electronic device employing a battery cover assembly in accordance with an exemplary embodiment.
Figure 2:
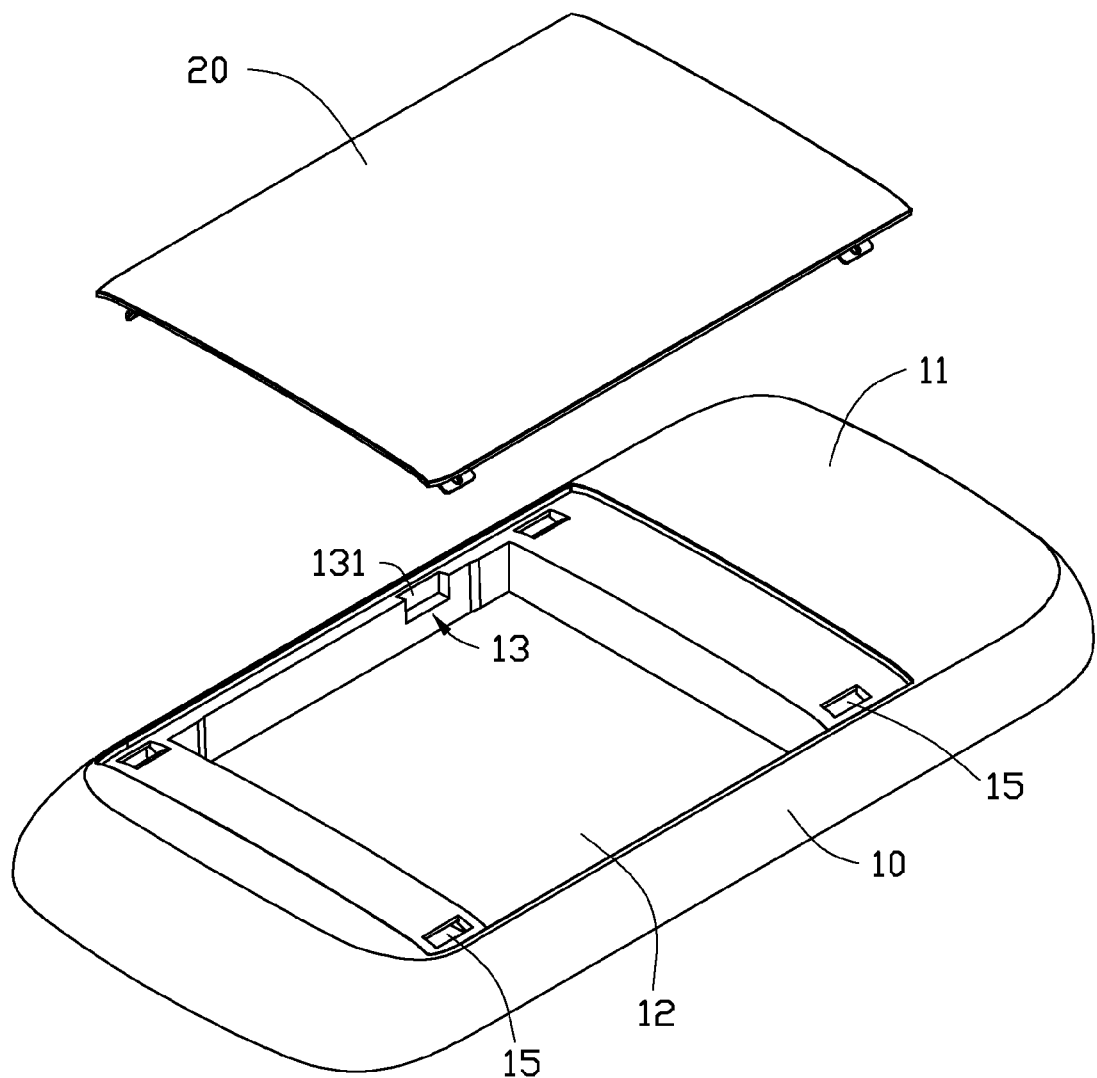
FIG. 2 is an exploded view of the portable electronic device of FIG. 1.

FIGS. 1 and 2 show a portable electronic device 100, such as a mobile phone, employing a battery cover assembly. The mobile phone is an exemplary application, for the purposes of describing details of an exemplary embodiment of a battery cover assembly. The battery cover assembly incorporates a housing 10 and a battery cover 20.

The housing 10 includes a surface 11. The surface 11 defines a receiving cavity 12 configured for receiving a battery, and a notch 13, communicating with the receiving cavity 12. The notch 13 is defined in a boundary of the receiving cavity 12, and defines a resisting wall 131. The surface 11 defines two pairs of latching holes 15, respectively, at two sides of the receiving cavity 12.

Figure 3:
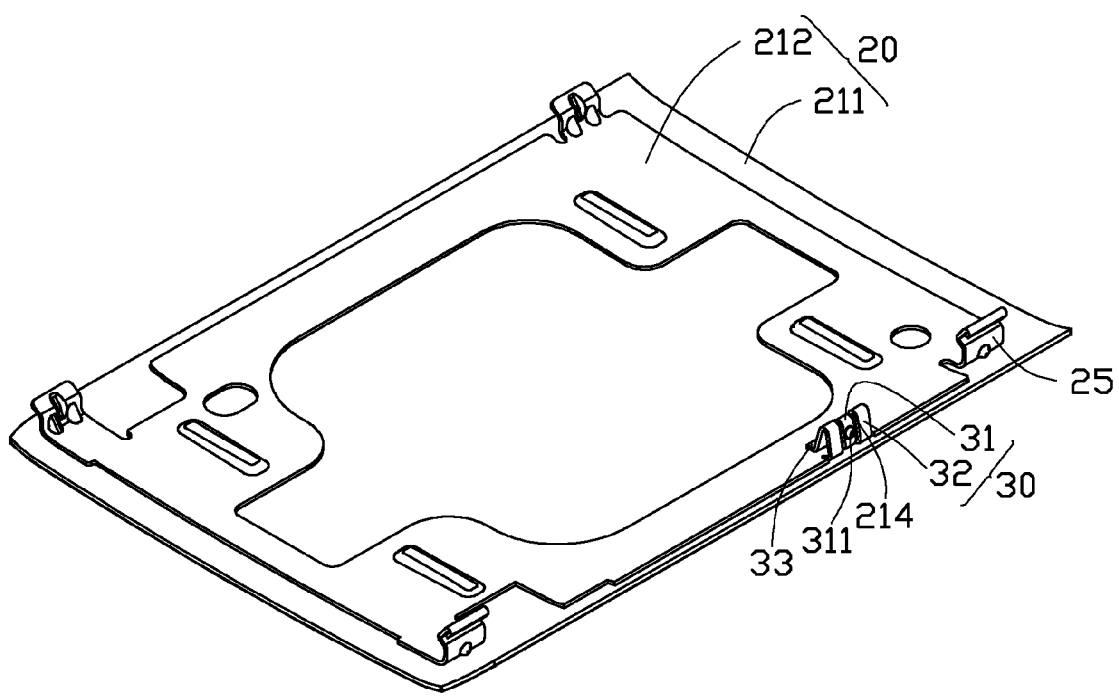
FIG. 3 is an isometric view of the battery cover of FIG. 2.
Figure 4:
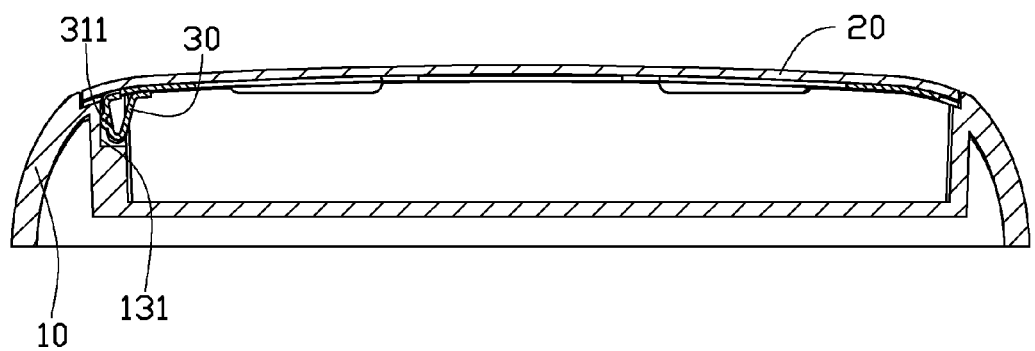
FIG. 4 is a cross-sectional view of the battery cover assembly of FIG. 1 along line IV-IV.

The battery cover 20 is detachably attached to the surface 11 of the housing 10. FIGS. 3 and 4 also show that the battery cover 20 includes a main plate 211 and a subsidiary plate 212 attached on the main plate 211. The subsidiary plate 212 is made of metal, and is integrally formed with the main plate 211 by insert molding.

The subsidiary plate 212 includes two pairs of clasps 25 formed at two opposite edges thereof, and a resisting sheet 30. The resisting sheet 30 is formed at a side of the subsidiary plate 212, and between a pair of clasps 25. The clasps 25 are engageable in the latching holes 15 of the housing 10. The clasps 25 are formed by bending a portion of the subsidiary plate 212.

The resisting sheet 30 is engaged in the notch 13 of the housing 10. The resisting sheet 30 is approximately "V" shaped, and is formed by first bending a portion of the subsidiary plate 212 substantially perpendicularly to the subsidiary plate 212 and then bending towards the subsidiary plate 212 to form an approximate "V" shaped sheet. The resisting sheet 30 includes two reinforcing ribs 32 and a resisting portion 31 between the two reinforcing ribs 32. The reinforcing ribs 32 can improve the strength of the resisting portion 31, thus damaging of the resisting portion 31 can be avoided when dropped. The resisting sheet 30 forms a distal end 33 which extends downward from the resisting sheet 30 to resist the subsidiary plate 212. A gap 214 is formed between each reinforcing rib 32 and the resisting portion 31. The resisting portion 31 includes a hooked portion 311 vertically protruding from one side of the resisting portion 31 opposite to the distal end 33, and towards the resisting wall 131 of the notch 13. When the battery cover 20 is attached on the housing 10, the resisting portion 31 is engaged in the notch 13 and the hooked portion 311 resists against the resisting wall 131 along a transverse direction.

During assembly of the battery cover assembly, one side of the battery cover 20 is attached on the housing 10, and one pair of the clasps 25 of the battery cover 20 is first engaged in one pair of the latching holes 15. Then, another side of the battery cover 20 is pressed to allow the resisting sheet 30 to be latched in the notch 13, and the remaining clasps 25 to be engaged in the remain latching holes 15. Since the hooked portion 311 is engaged in the notch 13 and resists against the resisting wall 131, the assembled battery cover 20 can be stably attached to the housing 10. Additionally, the distal end 33 of the resisting sheet 30 resists against the subsidiary plate 212, which further enhances the stability of the battery cover 20 attaching to the housing 10.

It is believed that the exemplary embodiment and its advantages will be understood from the foregoing description, and it will be apparent that various changes may be made thereto without departing from the spirit and scope of the disclosure or sacrificing all of its advantages, the examples hereinbefore described merely being preferred or exemplary embodiment of the disclosure.

What is claimed is:

1. A battery cover assembly for a portable electronic device, the battery cover assembly comprising:
   a housing defining latching holes and a notch, the notch having a resisting wall;
   a battery cover comprising clasps and a V-shaped resisting sheet, the resisting sheet comprising two reinforcing ribs and a resisting portion, the resisting portion positioned between the two reinforcing ribs, a gap defined between each reinforcing rib and the resisting portion, the resisting portion having a hooked portion formed thereon and towards the resisting wall, the clasps being releasably latched in the latching holes, the resisting portion being latched in the notch and the hooked portion resisting against the resisting wall.

2. The battery cover assembly as claimed in claim 1, wherein the battery cover comprises a main plate and a subsidiary plate attached on the main plate, the subsidiary plate is made of metal, and is integrally formed with the main plate by insert molding.

3. The battery cover assembly as claimed in claim 2, wherein the subsidiary plate comprises two pairs of the clasps formed at two opposite edges of the subsidiary plate, and the housing defines two pairs of the latching holes receiving the clasps.

4. The battery cover assembly as claimed in claim 3, wherein the notch is defined between one pair of latching holes, the reinforcing ribs and the resisting portion are latched in the notch.

5. The battery cover assembly as claimed in claim 2, wherein the resisting sheet is a bent part of the subsidiary plate, the resisting sheet comprises a distal end extending downwardly therefrom, the distal end resists the subsidiary plate.

6. The battery cover assembly as claimed in claim 3, wherein the housing comprises a surface, the surface defines a receiving cavity and the notch, the notch is defined at a boundary of the receiving cavity and communicates with the receiving cavity.

7. The battery cover assembly as claimed in claim 6, wherein the two pairs of latching holes are defined in the surface and at two sides of the receiving cavity.

8. A portable electronic device comprising:
a housing defining two latching holes and a notch, the notch having a resisting wall;
a battery cover comprising two clasps and a V-shaped resisting sheet, the resisting sheet comprising two reinforcing ribs and a resisting portion, the resisting portion positioned between the two reinforcing ribs, a gap defined between each reinforcing rib and the resisting portion, the resisting portion having a hooked portion formed thereon and towards the notch, the two clasps latchable in the two latching holes, the resisting portion latchable in the notch and the hooked portion resisting against the notch, the resisting sheet latched in the notch and the hooked portion resisting against the resisting wall.

9. The portable electronic device as claimed in claim 8, wherein the battery cover comprises a main plate and a subsidiary plate attached on the main plate, the subsidiary plate is made of metal, and is integrally formed with the main plate by insert molding.

10. The portable electronic device as claimed in claim 9, wherein the subsidiary plate comprises two pairs of the clasps formed at two opposite edges of the subsidiary plate, and the housing defines two pairs of the latching holes receiving the clasps.

11. The portable electronic device as claimed in claim 10, wherein the notch is defined between one pair of the latching holes, the reinforcing ribs and the resisting portion are latched in the notch.

12. The portable battery cover assembly as claimed in claim 9, wherein the subsidiary plate defines the resisting sheet, the resisting sheet comprises a distal end extending downwardly therefrom, the distal end resists the subsidiary plate.

13. The portable electronic device as claimed in claim 11, wherein the housing comprises a surface, the surface defines a receiving cavity and the notch, the notch is defined at a boundary of the receiving cavity and communicates with the receiving cavity.

14. The portable battery cover assembly as claimed in claim 13, wherein the two pairs of latching holes are defined in the surface and at two sides of the receiving cavity.

\* \* \* \* \*